United States Patent [19]

Zetting et al.

[11] 4,225,859

[45] Sep. 30, 1980

[54] METHOD AND APPARATUS FOR MONITORING SOUND-CONDUCTING MEDIA

[75] Inventors: Alois Zetting, Herrliberg; Markus Köpfli, Wil-St. Gallen, both of Switzerland

[73] Assignee: Cerberus AG, Männedorf, Switzerland

[21] Appl. No.: 900,725

[22] Filed: Apr. 27, 1978

Related U.S. Application Data

[62] Division of Ser. No. 743,392, Nov. 19, 1976, Pat. No. 4,142,188.

[30] Foreign Application Priority Data

Dec. 8, 1975 [CH] Switzerland .................. 15848/75
Sep. 29, 1976 [CH] Switzerland .................. 12296/76

[51] Int. Cl.³ .................................................. G08B 13/22
[52] U.S. Cl. .................................. 340/566; 340/550; 367/93
[58] Field of Search .................. 340/1 C, 3 C, 15 CC, 340/15 TC, 55 D, 558, 559, 565, 566, 1 R; 367/11, 93, 136

[56] References Cited

U.S. PATENT DOCUMENTS

| 3,431,551 | 3/1969 | Rollwitz et al. | 340/1 R |
|---|---|---|---|
| 3,603,919 | 9/1971 | Moore | 340/1 R |
| 3,614,719 | 10/1971 | Treacy | 340/1 R |
| 3,794,964 | 2/1974 | Katakura | 340/1 R |
| 3,946,377 | 3/1976 | Zetting | 340/550 |
| 3,967,283 | 6/1976 | Clark et al. | 340/554 X |
| 4,023,156 | 5/1977 | Galvin | 340/565 X |
| 4,034,331 | 7/1977 | Menin et al. | 340/1 C X |
| 4,054,867 | 10/1977 | Owens | 340/566 X |
| 4,088,989 | 5/1978 | Solomon | 340/550 X |
| 4,112,420 | 9/1978 | Mifune et al. | 340/566 X |

*Primary Examiner*—John W. Caldwell, Sr.
*Assistant Examiner*—Joseph E. Nowicki
*Attorney, Agent, or Firm*—Werner W. Kleeman

[57] ABSTRACT

A method of, and apparatus for, monitoring sound-conducting media wherein sound vibrations are transmitted to and absorbed by the sound-conducting medium. The frequency of the transmitted sound vibrations periodically pass through a predetermined frequency range. During an evaluation period the course of any one of the amplitude or phase of the received sound vibrations are compared with the course of the amplitude or phase during one of the preceding evaluation periods, and when there occur predetermined deviations of both amplitude courses or both phase courses from one another there is triggered an alarm signal.

19 Claims, 4 Drawing Figures

METHOD AND APPARATUS FOR MONITORING SOUND-CONDUCTING MEDIA

CROSS-REFERENCE TO RELATED CASE

This application is a divisional application of our commonly assigned, copending U.S. application Ser. No. 743,392, filed Nov. 19, 1976 now U.S. Pat. No. 4,142,188, granted Feb. 27, 1979.

BACKGROUND OF THE INVENTION

The present invention relates to a new and improved method of monitoring sound-conducting media, wherein sound vibrations are transmitted to a sound-conducting medium and are received by such medium, and further, the invention relates to apparatus for the performance of the aforementioned method and to the use of such method.

Under the expression sound vibrations or equivalent terminology there is to be understood vibrations in every frequency range where there is possible transmission through the monitored medium, especially vibrations in the ultrasonic range.

As the sound-conducting media there can be used random solid objects, such as for instance glass panes or windows or metallic walls. Mounted thereat is at least one vibration or oscillation transmitter which delivers the sound conducted through solids, preferably in the ultrasonic range, to the glass pane or metallic wall. Mounted at another location is at least one vibration or oscillation receiver which picks-up the ultrasonic vibrations transmitted through the pane, wall or surface. Connected with the vibration receiver is an electrical evaluation circuit controlling a signal device. The vibration receiver can be arranged at another optional location, for instance also directly neighboring the vibration transmitter. According to a special arrangement, the vibration or oscillation transmitter can also simultaneously serve as the vibration or oscillation receiver.

Apparatuses of this type can serve, for instance, as intrusion protection devices to safeguard against a burglar or other intruder from breaking into store windows, glass showcases, or safety deposit vaults. Here, the glass panes or vault walls serve as the sound-conducting medium. The present invention, however, is in no way limited to this field of protecting surface-like or areal objects, rather also can be beneficially employed in the same manner for protecting or monitoring random sound-conducting media, for instance, objects on display in museums or showcases or display cabinets, fenced in areas, or as ultrasonic room protection, wherein the object itself, the material of the fencing or enclosure or the air located in a room serves as the sound-conducting medium and any changes in such room lead to a change in the sound field.

A monitoring arrangement known from German patent publication No. 1,913,161 discloses the transmission of sound in the ultrasonic region conducted through a body to the object to be monitored. The ultrasonic arriving at the measuring location is recorded and upon attenuation of the amplitude an alarm device is activated. An alarm is not only however triggered upon damaging or destruction of the object, rather also when it is touched. In practice, for instance in the case of store windows, where accidental touching of the window is unavoidable, this oftentimes results in triggering of a false alarm.

According to a further heretofore known method as disclosed in German patent publication No. 2,056,015 a protected object, especially a glass plate or pane, is placed into resonance vibration or oscillation by means of a vibration transmitter and the vibrations are tapped-off by means of a vibration receiver. Also in this case, when there is a change in amplitude an alarm signal is triggered. Once again, what is of disadvantage with this construction is that an amplitude change and therefore triggering of an alarm not only occurs when the pane is damaged, but even when it is merely contacted. What is additionally a drawback is that the resonance locations of a glass pane also tend to shift in the presence of temperature changes or when its surface is wetted, as when it rains. Also in this case the vibration amplitude varies, without there being present any real reasons for triggering an actual alarm.

In Swiss patent No. 557,068 there is described a method wherein for the most part such drawback can be avoided. In this respect use is made of the recognition that the monitored medium possesses closely situated resonance points in a certain frequency range. For evaluation purposes there is employed the so-called group transit phenomenon which prevails due to the fact that at the region of a resonance point the time-difference of a modulation signal superimposed upon the sound oscillations or vibrations, between the receiver and the transmitter varies extremely markedly even with slight changes in the resonance frequency. Consequently, even slight damage to the medium, resulting in a pronounced displacement of the resonance spectrum can be detected, yet during contact there does not occur any false alarm.

What is disadvantageous with this arrangement is that the employed carrier frequency must be adjusted relatively exactly so that it appears in a frequency range where the resonance points or locations are close to one another. Yet, as a practical matter this is oftentimes extremely difficult to accomplish, particularly if the installation of the equipment is not carried out by specially trained personnel.

SUMMARY OF THE INVENTION

Hence, it is a primary object of the present invention to provide a new and improved method of, and apparatus for, monitoring sound-conducting media in a manner not associated with the aforementioned drawbacks and limitations of the prior art proposals.

Another and more specific object of the present invention aims at avoiding the aforementioned disadvantages, especially strives to provide a functionally reliable, disturbance-free, monitoring- and protection method and system with the aid of sound-transmission in monitored medium with reduced susceptability to false alarms, and which system can be installed and adjusted in a simple manner, without any fear in loss of its sensitivity.

Still a further significant object of the present invention aims at the provision of a novel method of, and apparatus for, monitoring sound-conducting media in a positive and reliable fashion, with increased reliability and lesser susceptability to disturbance while minimizing the probability of false alarms.

Now in order to implement these and still further objects of the invention, which will become more readily apparent as the description proceeds, the method of the present development is generally manifested by the features that the frequency of the transmitted sound vibrations periodically pass through a certain frequency range, the course of the phase or amplitude of the received sound vibrations are compared during an evaluation period with the phase course or amplitude course during a preceding evaluation period, and when there is present a predetermined deviation of both phase courses or amplitude courses from one another there is triggered an alarm signal. The evaluation period may be, for instance, equal to or greater than the frequency throughpass period.

Not only is the invention concerned with the aforementioned method aspects, but also relates to apparatus for the performance thereof, wherein there is provided a sound transmitter for delivering sound vibrations to the monitored medium and controlled by a device for the periodic, continuous change of the frequency, a sound receiver for periodically picking-up or receiving the sound vibrations transmitted through the monitored medium and converting such into an electrical signal. There is further provided an evaluation circuit which is constructed to compare the phase course or amplitude course of the received sound vibrations during an evaluation period with the phase course or amplitude course prevailing during a previous evaluation period, and when there is present a predetermined difference of the phase course or amplitude course of both evaluation periods controls an alarm device.

Since with this method there is periodically covered an entire frequency range, an exact adjustment to certain resonance points or locations is no longer necessary as long as the frequency range contains at least one or a number of such resonance points or if due to reflection and its interference there does not occur amplitude- and phase fluctuations. Nonetheless, the positive functioning of the equipment is ensured, since even with slight damage to or change in the medium the resonance points shift and this shift can be positively detected during evaluation.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
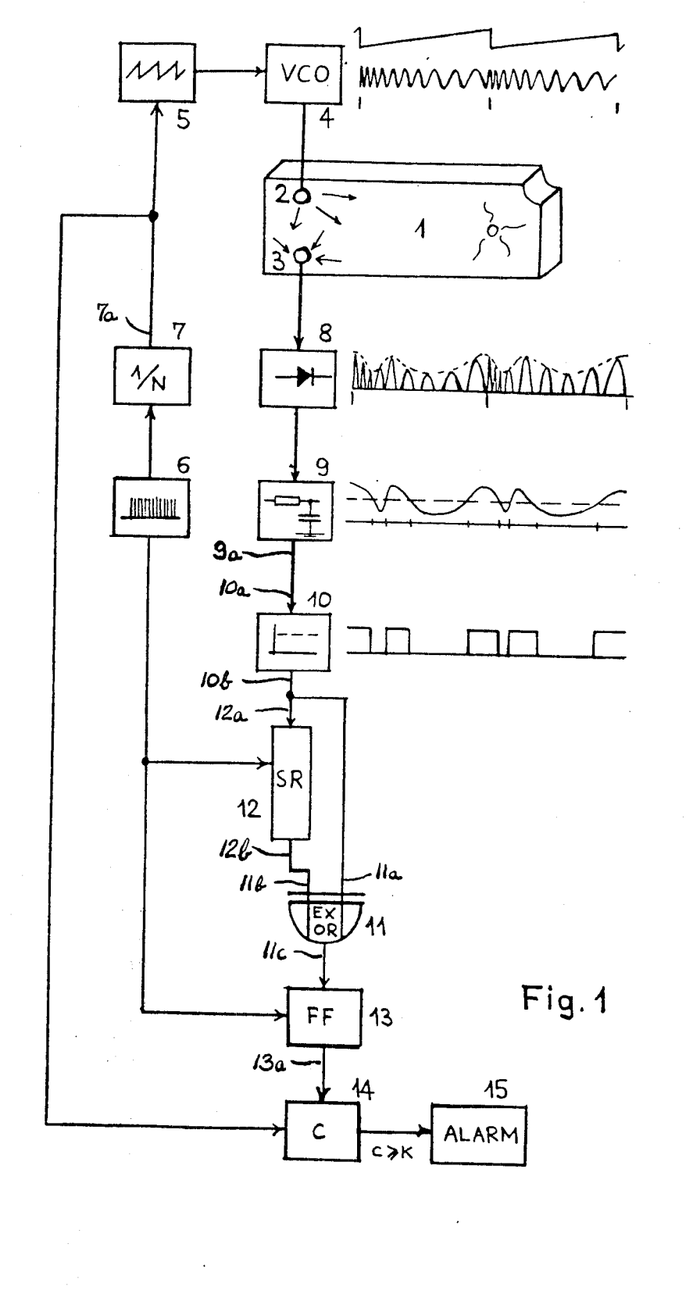
FIG. 1 is a block circuit diagram of an exemplary embodiment of apparatus useful in the performance of the inventive method.

Describing now the drawings, with the exemplary embodiment of apparatus illustrated in FIG. 1 there are mounted at the sound-conducting medium 1, for instance a glass pane or plate or a vault wall, a sound transmitter 2 and a separate sound receiver 3. Both components can be designed, for instance, as commercially available piezoelectric elements. The sound transmitter 2 is controlled by an oscillator 4 having a regulatable oscillation frequency. Oscillator 4 may be of the type CD4046 available from Radio Corporation of America (RCA). The frequency of the oscillator 4 is controlled by a voltage transmitter 5 which, for instance, is designed as a relaxation oscillator or sweep generator having a predetermined period. The frequency of the oscillator 4 continuously passes through a predetermined oscillation frequency range and at the end of a throughpass period again returns to the starting value of the frequency, whereafter the operation periodically repeats.

Since for the subsequent evaluation there is necessary a synchronization, it is advantageous to control the relaxation oscillator 5 by means of a clock generator 6 via a frequency converter or divider 7 in a fixed relationship to the clock frequency. The clock generator 6 may be, for instance, type CD4049 and the frequency converter 7 type CD4040, each commercially available from RCA.

The vibrations or oscillations received by the vibration or oscillation receiver 3 are converted into an electrical signal which is rectified by a rectifier 8, such as commercially available type MC1709 of Motorola Corporation. A low-pass filter 9 connected therewith forms the envelope from the rectified signal, and the carrier frequency range of the oscillator 4 is eliminated, so that at the output of the low-pass filter 9 there only appears the resonance spectrum of the transmitting medium 1 which periodically repeats during each throughpass as long as nothing has changed at or in the medium 1.

During the subsequent evaluation, the amplitude- or phase spectra are compared with one another during different throughpass periods. This can be accomplished both in an analog as well as digital manner, for instance by feeding the resonance curve to a storage and recalling the stored signal during the next following throughpass period and comparing such with the direct signal. The storage can be, for instance, an analog storage, as will be explained more fully hereinafter.

In the circuit arrangement of FIG. 1, this procedure is carried out, however, digitally in that initially the output signal of the low-pass filter 9 appearing at the output 9a is delivered to the input 10a of a threshold value former 10 (e.g. Motorola type MC1741) which converts the curve into a square wave signal which, on the one hand, is delivered from its output 10b directly to one input 11a of an Exclusive-OR-gate 11, and, on the other hand is introduced into a shift register 12 by means of its input 12a. An example of a suitable Exclusive-OR-gate 11 is RCA type CD4030 and of the shift register RCA type CD4031. The switching or shifting of the shift register 12 is controlled by the clock generator 6. Since the period of the sweep generator or relaxation oscillator 5 is in a fixed relationship to the spacing of the clock pulses of the clock generator 6, there always appears at the output 12b of the shift register 12 a signal shifted by exactly one period, which is then delivered to the other input 11b of the Exclusive-OR-gate 11. At the output 11c of this logic gate 11 there thus only then appears a signal when there exists between the resonance curves, during a frequency throughpass, differences with respect to the preceding throughpass. In this respect, it is to be remarked that the shift register 11 also can be controlled such that the direct signal is compared with the second-last, third-last, and so forth throughpass. Instead of using a threshold value switch or former 10 there also can be provided an analog-digital converter.

The output signal of the gate circuit or logic gate 11 controls a JK-flip-flop circuit 13 (such as RCA type CD4027) which is likewise clocked by the clock generator 6, as shown. At the output 13a of the flip-flop 13 there thus appear at such clock rate output pulses, whenever the compared signals differ and at the same time switching errors caused by digitalization are eliminated. These output pulses are now delivered to a counter 14 (such as RCA type 4040) which is connected with the output 7a of the frequency converter 7 such that it is reset after each frequency throughpass. The counter 14 is designed to deliver an alarm signal to an alarm device 15 (such as RCA type CD4001) when the number of pulses counted in a throughpass period exceeds a predetermined number k.

Figure 2:
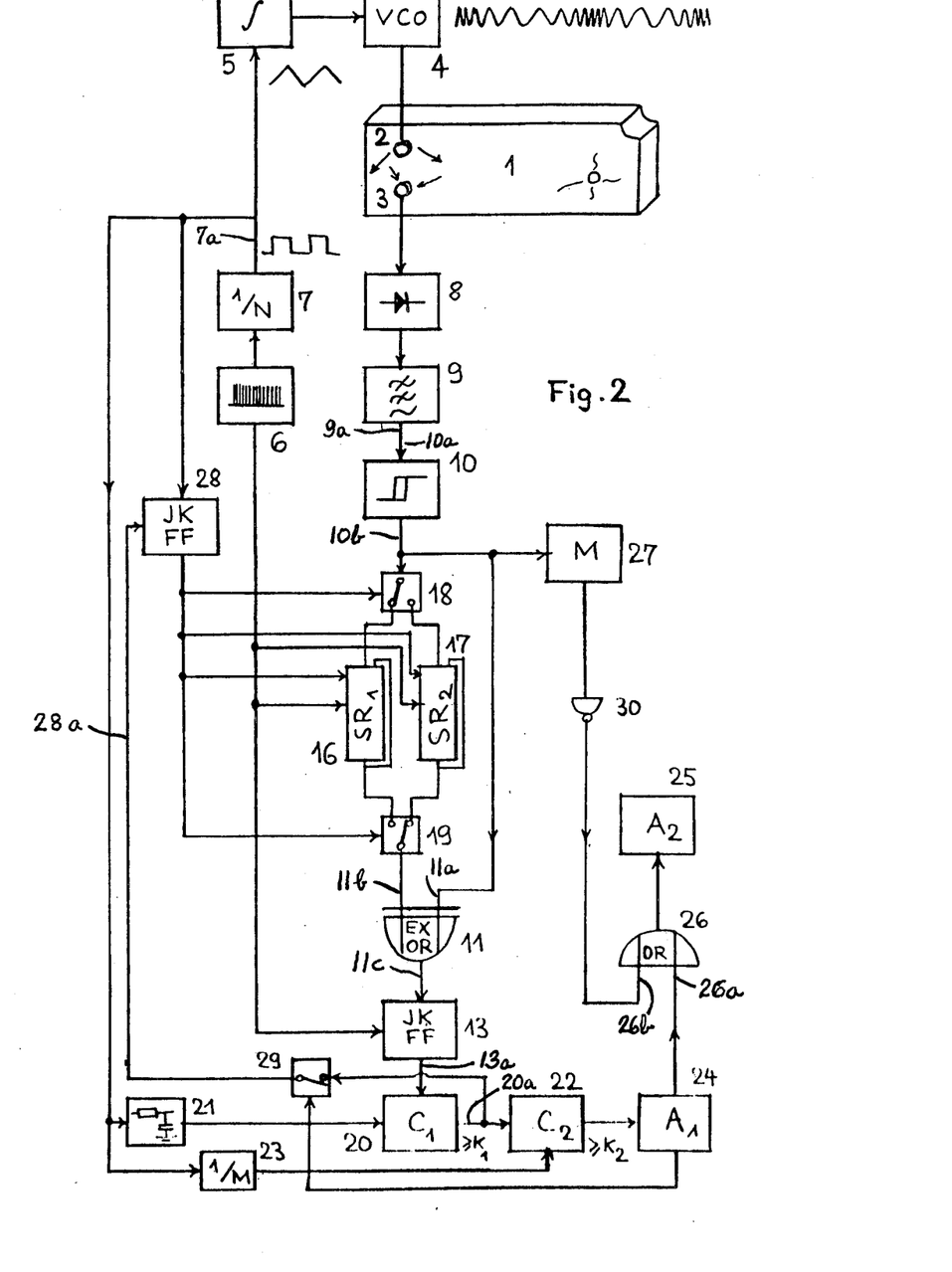
FIG. 2 is a block circuit diagram of a further embodiment of apparatus constructed according to the invention.

FIG. 2 illustrates the circuit diagram of a further improved monitoring apparatus. As a matter of convenience, it is to be appreciated that the same or analogous components have been generally designated with the same reference characters as used for the first exemplary embodiment of FIG. 1, and this also is the case for the other embodiments.

Again, an oscillation or vibration transmitter 2 and an oscillation or vibration receiver 3 are arranged at the monitored medium 1. The transmitter 2 is supplied by an oscillator 4, the frequency of which is controlled by a clock generator 6 through the agency of a frequency converter or divider 7 and an integrator 5 for forming the control voltage in such a manner that the oscillation frequency of the oscillator 4 continually moves back and forth over a certain range. The output signal of the receiver 3 is again delivered by means of a rectifier 8 and a low-pass filter 9, at the output 9a of which there appears the spectrum of the sound-conducting medium 1, to a Schmitt-trigger 10 (such as Siemens type TAA861) functioning as a threshold value detector and pulse shaper. The so-called backlash or hysteresis phenomenon i.e. the easily differentiable threshold values during their increase and decrease are used to eliminate small possibly existing fluctuations.

The output signal of the Schmitt-trigger is further processed along two signal paths, and specifically first of all by means of the comparison circuit consisting of two shift registers 16 and 17 (such as Motorola type MC14517) and two reversing switches 18 and 19 (such as RCA type CD4019). Due to the use of two shift registers 16 and 17 it is possible, instead of comparing a signal with the directly following signal as in the first embodiment, to store a signal over a certain time in order to bridge short-time disturbances. Both shift registers 16 and 17 are simultaneously further switched or shifted by the clock generator 6. The reversing switchings 18 and 19 are always in their opposed positions, and switched into the opposite positions by the output of the frequency converter 7 at the end of each period. This is specifically accomplished such that in each case the signal is introduced into the one shift register whereas it is emptied from the other shift register. The removed signal is again delivered to the one input 11b of an Exclusive-OR-gate 11, the other input 11a of which directly receives the output signal of the Schmitt-trigger 10. At the output 11c of the Exclusive-OR-gate 11 there thus only then appears a signal when the direct signal differs from the second-last signal. The following series connected JK-flip-flop 13 again serves to suppress the switching errors which may have arisen during digitalization.

In order to further improve the security against false alarms and for suppressing short-time disturbances, there are connected in series, according to this second embodiment, two counters 20 and 22 (such as RCA type CD4040) for processing the output signal appearing at the output 13a of the flip-flop 13. The first counter 20 is controlled by the output of the frequency divider 7 by means of a time-delay element 21, the time-constant of which exactly corresponds to the frequency period of the integrator 5, so that its display or read-out is always then extinguished after a period of time corresponding to the frequency period. Only when this counter 20 has recorded more than $K_1$ pulses during a period, does it deliver an output signal to the second counter 22. The second counter 22 now is triggered by means of a further frequency divider 23 (such as RCA type CD4040) such that its reset time amounts to a multiple of the reset time of the first counter 20. Only after the second counter 22 has received from the first counter 20, within this longer reset time, a predetermined number of pulses $K_2$, is a signal delivered to the first or internal alarm device 24 and via the input 26a of an OR-gate 26 to the external alarm device 25. Consequently, disturbances of short duration, the duration of which does not appreciably exceed the resetting time of the second counter 22 do not produce an alarm, only changes or disturbances lasting over a longer period of time. The integrated circuit components 24, 25, 26 may be, for instance, RCA type CD4001.

However, in order to be able to also detect rapidly occurring damage or destruction of the protected medium, for instance sudden breaking of a glass pane, there is provided a blocking device for the reversing switches 18 and 19, which comprises a further JK-flip-flop 28 (for instance RCA type CD4027) controlled by the output 20a of the first counter 20. As soon as a signal appears at the output 20a of the counter 20, then the flip-flop circuit 28 is blocked, so that the periodic reversal of the switches 18 and 19 no longer occurs and the momentary value of the output signal of the Schmitt-trigger 10 is compared in sequence continuously with the contents of one of both shift registers 16 and 17. Now if the change in the medium, i.e. the output signal of the Schmitt-trigger 10 prevails for a period of time which exceeds the resetting time of the second counter 22, then by means of the internal alarm device 24 a controllable switch 29 (such as RCA type CD4016) arranged in the control line 28a of the flip-flop 28 is opened, so that the apparatus is again operational. In the meantime, however, the external alarm device 25 has been actuated.

For self-monitoring the functionality and for reporting unauthorized tampering, i.e. to protect against sabotage, the output signal of the Schmitt-trigger 10 is advantageously delivered to a second evaluation channel of a monostable circuit 27 (such as Motorola type MC14528), the resetting time of which is larger than the pulse spacing of the clock generator 6. In the event that the output signal of the Schmitt-trigger 10 always retains the same value, i.e. when there has not been detected any amplitude- or phase fluctuations in the medium 1, then the monostable circuit 27 delivers a signal which, depending upon the employed logic circuitry, is supplied directly or via an inverter 30 to the other input 26b of the OR-gate 26. In this way there is achieved the result that upon each interruption of the signal train or in the case of false selection of the frequency range, there is likewise delivered a signal to the alarm device 25.

It is here remarked that instead of carrying out the described amplitude evaluation, there also can be used a phase evaluation. Thus, the rectifier 8 is merely replaced by a phase detector, for instance, a PLL (Phase locked loop). Conceptually, then, the illustrated component 8 can be a phase detector. Further it is mentioned that with the described method it is possible to also monitor a number of series connected media, for instance a number of glass panes, and the receiver of the one medium is connected in each instance via an amplifier with the transmitter of the following medium. It is also possible to monitor different types of media with one apparatus, for instance, by connecting a glass pane in series with a vault wall.

According to a practical exemplary embodiment of the invention for protecting a glass window or pane of a store, there was obtained a functionally reliable apparatus which was not susceptible to triggering false alarms, in that the oscillation frequency of the oscillator 4 was continually varied over a range between 120 kHz and 180 kHz. Further, the period of the frequency change amounted to about one-quarter of a second and the clock frequency of the clock generator 6 was in the order of about 150 Hz. It has been found that shift registers with a capacity of 64 bits were already adequate for the purposes of the invention although in most instances a better resolution is recommended. The resetting time of the counter 20 was selected to be exactly equal to the frequency period, i.e. about one-quarter of a second, whereas the resetting time of the counter 22, according to a practical exemplary embodiment, amounted to about 15 seconds. It has been found that an apparatus designed by way of illustration with the foregoing data, for the protection of the glass panes of stores, was suitable for all conventional sizes of glass panes or windows. There was always detected for evaluation purposes a sufficient number of amplitude- or phase peaks, so that positive functioning was ensured without having to resort to modifications or changes, for instance adjusting the frequency to the involved object or material.

With both of the described exemplary embodiments, there were employed separate sound transmitters 2 and sound receivers 3. However, the inventive method is predicated upon the concept that standing waves are produced in the monitored sound-conducting medium, the amplitude- or phase change of which is detected by the excitation frequency. For this purpose, the sound receiver 3 in principle can be arranged at any random location at the medium, for instance, also directly neighboring the sound transmitter 2. As already mentioned, the vibration or oscillation transmitter also can simultaneously serve as the vibration or oscillation receiver.

Figure 3:
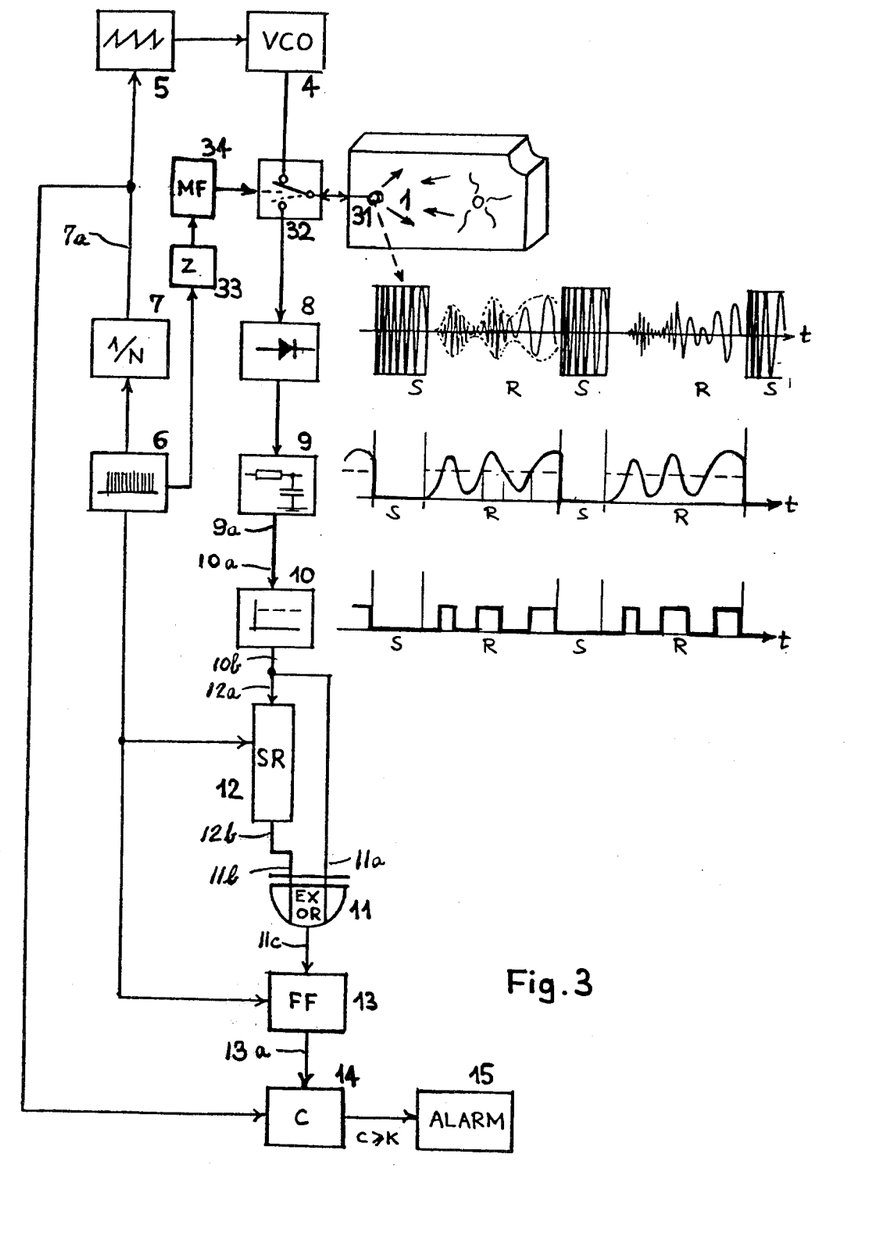
FIG. 3 illustrates a block circuit diagram of still a further embodiment of apparatus according to the invention.

In FIG. 3 there is illustrated the circuitry of such type embodiment, wherein, instead of a separate sound transmitter and sound receiver provided at the medium 1, for instance a glass pane or plate, there is only mounted a single electro-acoustical transducer 31. Such can contain, for instance, a piezoelectric element which is capable of both transmitting sound vibrations as well as also receiving such vibrations. Since in this case, however, the propagated sound vibrations are more intensive by a multiple factor than the received vibrations, it is necessary to separate both vibrations from one another. In the exemplary embodiment under consideration, this is accomplished in that the vibrations transmitted to the medium 1 are not continuously transmitted or radiated, rather only during short time periods S, and that in the intervals or pauses R between the transmitting times S there are taken-up or received vibrations by the same transducer. The transmitting time S in each instance can encompass a frequency throughpass period, whereas the receiving time R should encompass at least one period, preferably however should be larger by a multiple factor in order to take-up the entire resonance spectrum. In this regard, use is made of the fact that with one frequency throughpass the signal first again returns to the transducer after a predetermined phase transit time. It has been found that it is possible to select the frequency throughpass period S to be so short that the returned resonance spectrum can be taken-up relatively completely in the aforementioned intervals. According to a practical exemplary embodiment, a frequency throughpass period S, between 120 kHz and 180 kHz, lasts for about 10 msec. The receiving period R is in the order of magnitude of one-half of a second.

In order to separate the transmitted and received sound vibrations from one another, the electro-acoustical transducer 31 is connected via a reversing switch 32 (such as RCA type CD4016), for instance a flip-flop, with the oscillator 4 having a regulatable oscillation frequency. The frequency of this oscillator 4 is controlled, like in the example of FIG. 1, by means of a voltage transmitter 5 such that its frequency continuously passes through a certain oscillation frequency range and at the end of a throughpass period again returns to the starting value of the frequency, whereafter the process periodically repeats. As a modification of FIG. 1, in the embodiment of FIG. 3, there is provided a further frequency converter 33 (such as RCA type CD4040) which likewise is controlled by the clock generator 6. This frequency converter 33 controls at predetermined time intervals a monstable circuit or monoflop 34 (such as Motorola type MC14528) which during each pulse switches the reversing switch 32 into the other switching position. The switching times of the frequency converter 33 are selected such that the reversing switch 32 connects the electro-acoustical transducer 31 with the oscillator 4 during exactly one frequency throughpass period, and thereafter with the evaluation circuit during exactly an integral multiple of a frequency throughpass period. This evaluation circuit is constructed analogous to that of FIG. 1. The shift register 12 of the evaluation circuit is controlled by the clock generator 6 in such a manner that its switching period exactly corresponds to the sum of the transmitting time S and the receiving time R. However, since during the transmitting time the receiving circuit is disconnected by the reversing switch 32, during such evaluation only the signal arriving during the receiving time R is compared with the signal stored in the shift register 12 during one of the preceding throughpasses. Triggering of an alarm therefore occurs exactly in the same manner as with the preceding example, since during the evaluation the transmitted signal is automatically eliminated.

It is here remarked that instead of the evaluation circuit of FIG. 1, in this embodiment there also can be employed a complicated evaluation circuit, as illustrated for instance in FIG. 2. It has been found, however, that during the monitoring of a display window or glass pane of a store or the like it is adequate to use a shift register having a capacity of 64 bits, in order to be able to positively detect changes, for instance drilling of a hole or the breaking of a corner of the glass pane. There was always found a sufficient number of switching positions of the shift register which had changed during such a change at the glass pane, so that there was ensured for positive functioning of the system in the presence of even the slightest damage. Of course, there can be selected a still better resolution if increased security is needed and the increased costs are justifiable.

Figure 4:
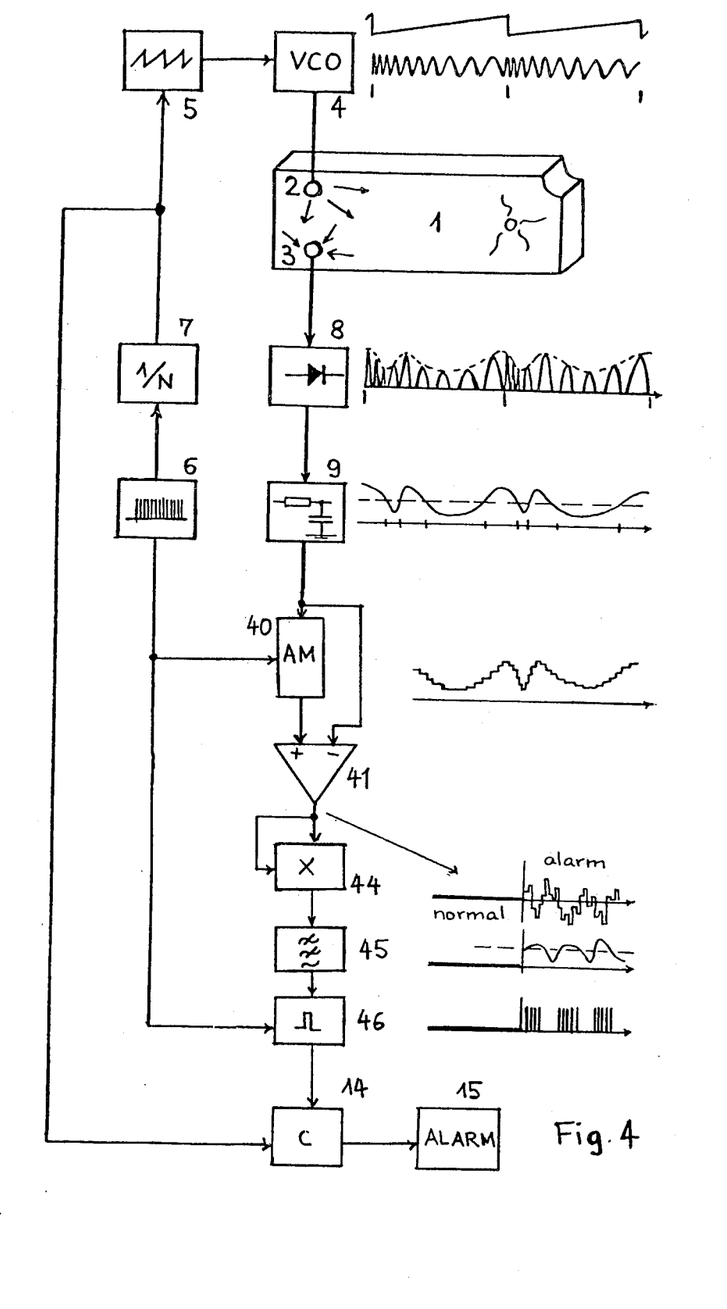
FIG. 4 illustrates another embodiment of inventive apparatus.

With the embodiment of FIG. 4, this is achieved in that here there is used, instead of a shift register, an analog storage or memory 40 (such as Reticon type SAD1024), the output signal of which is processed by means of a differential amplifier 41 (such as Motorola type MC3302), a multiplier 44, a low-pass filter 45, and a pulse shaper 46. In the event of an alarm, a differential signal appears which, by means of the pulse shaper 46, is used in the described manner for triggering an alarm 15 by means of a counter 14.

While there are shown and described present preferred embodiments of the invention, it is to be distinctly understood that the invention is not limited thereto, but may be otherwise variously embodied and practiced within the scope of the following claims.

Accordingly, what we claim is:

1. A method of monitoring vibration characteristics of sound-conducting media, comprising the steps of:
   providing at least one sound-conducting medium;
   transmitting sound vibrations to the sound-conducting medium;
   controlling the frequency of the transmitted sound vibrations so as to periodically pass through a predetermined frequency range during successive frequency throughpass periods separated by interval periods during which the transmission of the sound to the medium is interrupted;
   receiving the returned frequency spectrum of the sound vibrations at the sound-conducting medium;
   comparing the amplitude course or phase course of the received sound vibrations during a given evaluation period comprising a frequency throughpass period and an interval period with the amplitude course or phase course during a preceding evaluation period;
   each said evaluation period being larger than the frequency throughpass period; and
   triggering an alarm when there are present deviations of both amplitude courses or both phase courses from one another due to a sudden change of the vibration resonance spectrum of the sound-conducting media.

2. The method according to claim 1, further including the step of:
   comparing the amplitude course or phase course of the received sound vibrations during said given evaluation period with the amplitude course or phase course during the evaluation period directly preceding said given evaluation period.

3. The method according to claim 1, further including the step of:
   comparing the amplitude course or phase course of the received sound vibrations during said given evaluation period with the amplitude course or phase course of the next to last evaluation period.

4. The method according to claim 1, further including the steps of:
   periodically alternately transmitting the sound vibrations during a frequency throughpass period, during which time there is discontinued the reception of the sound vibrations; and
   during the remainder of the evaluation period receiving sound vibrations from the medium, during which time there is interrupted the transmission of the sound vibrations to the medium.

5. The method according to claim 4, further including the step of:
   selecting the evaluation period to be an integral multiple of the frequency throughpass period.

6. The method according to claim 2, further including the steps of:
   periodically alternately transmitting the sound vibrations during a frequency throughpass period, during which time there is discontinued the reception of the sound vibrations; and
   during the remainder of the evaluation period receiving sound vibrations from the medium, during which time there is interrupted the transmission of the sound vibrations to the medium.

7. The use of the method of claim 1, for protecting against unauthorized intrusion.

8. The method according to claim 1, further including the step of:
   providing as the sound-conducting medium a glass pane.

9. The method according to claim 1, further including the step of:
   providing as the sound-conducting medium a metallic vault wall.

10. The method as defined in claim 1, further including the step of:
    providing as the sound-conducting medium the air located in a room.

11. An apparatus for monitoring vibration characteristics of sound-conducting media comprising:
    sound transmitter means for delivering sound vibrations to a monitored medium;
    means for the periodic continuous change of the frequency of the sound vibrations during each of successive frequency throughpass periods for controlling the sound transmitting means, said frequency throughpass periods being separated by interval periods during which the transmission of sound vibrations is interrupted;
    sound receiver means for taking-up the sound vibrations and converting such into an electrical signal;
    an electro-acoustical transducer simultaneously serving as the sound transmitter means and sound receiver means;
    an evaluation circuit for comparing the amplitude course or phase course of the taken-up sound vibrations during an evaluation period comprising a frequency throughpass period and an interval period with the course of the amplitude or phase during a previous evaluation period;
    reversing switch means for periodically alternately connecting, during a predetermined time duration, the frequency change means with the electro-acoustical transducer, and during a further predetermined time connecting the evaluation circuit with the electro-acoustical transducer and disconnecting the frequency change means;
    the switching period of the reversing switch means being equal to the evaluation period;
    an alarm device; and
    said evaluation circuit controlling the alarm device when there exists a predetermined difference between the respective amplitude course of respective phase course of both evaluation periods due to a sudden change of the vibration resonance spectrum of the sound-conducting media.

12. The apparatus according to claim 11, wherein said evaluation circuit includes:
   at least one shift register for storing the amplitude course or phase course during an evaluation period.

13. The apparatus according to claim 11, wherein said evaluation circuit includes:
   an Exclusive-OR-gate having an input;
   a shift register for storing the amplitude course or phase course during an evaluation period;
   said shift register having an output; the input of the Exclusive-OR-gate being connected with the output of the shift register.

14. The apparatus according to claim 11, wherein said evaluation circuit includes:
   an Exclusive-OR-gate having a first input and a second input;
   a shift register for storing the amplitude course or phase course during an evaluation period;
   said shift register having an output;
   the first input of the Exclusive-OR-gate being connected with the output of the shift register;
   the second output of the Exclusive-OR-gate being directly controlled by a signal formed from the amplitude course or phase course.

15. The apparatus according to claim 11, wherein said evaluation circuit includes:
   a converter for transforming the amplitude course or phase course into a digital signal.

16. The apparatus as defined in claim 15, further including:
   a counter having an input to which there is supplied the digital signal;
   said counter delivering an output signal to the alarm device when the number of arriving pulses within a predetermined reset time exceeds a predetermined number.

17. The apparatus according to claim 11, wherein:
   said frequency change means comprises an oscillator having a continually variable frequency.

18. The apparatus according to claim 17, wherein:
   said evaluation circuit comprises at least one storage;
   a common clock generator for controlling said oscillator, said at least one storage of the evaluation circuit and the reversing switch means of the electro-acoustical transducer.

19. The apparatus according to claim 18, further including:
   frequency converter means connected in circuit with said common clock generator for controlling switching of said reversing switch means in response to operation of said common clock generator.

* * * * *